United States Patent
Chiu

(10) Patent No.: US 9,160,573 B1
(45) Date of Patent: Oct. 13, 2015

(54) TRANSMISSION LINE LOAD ANTENNA MODULE

(71) Applicant: Sage Elephant Tech Co., Ltd., Hsinchu (TW)

(72) Inventor: Hung-Hsien Chiu, Hsinchu (TW)

(73) Assignee: Sage Elephant Tech Co., Ltd., Hsinchu (TW)

( * ) Notice: Subject to any disclaimer, the term of this patent is extended or adjusted under 35 U.S.C. 154(b) by 33 days.

(21) Appl. No.: 14/219,008

(22) Filed: Mar. 19, 2014

(51) Int. Cl.
*H04M 1/00* (2006.01)
*H04L 25/02* (2006.01)
*H04B 1/3827* (2015.01)
*H04B 1/525* (2015.01)

(52) U.S. Cl.
CPC .......... *H04L 25/0278* (2013.01); *H04B 1/3838* (2013.01); *H04B 1/525* (2013.01)

(58) Field of Classification Search
USPC ......... 455/550.1, 575.5, 575.7; 343/790, 791, 343/702, 822, 829, 830
See application file for complete search history.

(56) References Cited

U.S. PATENT DOCUMENTS

| 4,626,862 A * | 12/1986 | Ma .............................. 343/702 |
| 8,957,815 B2 * | 2/2015 | Chiu et al. ..................... 343/702 |
| 2009/0066600 A1 * | 3/2009 | Rabinovich ................... 343/793 |
| 2014/0104116 A1 * | 4/2014 | Chiu et al. ..................... 343/702 |

* cited by examiner

*Primary Examiner* — Fayyaz Alam
(74) *Attorney, Agent, or Firm* — Leong C. Lei

(57) ABSTRACT

The antenna module contains a transmission line, a resonant radiation area, and an antenna base. An end of the transmission line is installed in the resonant radiation area. The resonant radiation area contains a positive zone and a negative zone. A section of the positive zone and a section of the negative zone are arranged in parallel where an adjustable impedance zone is formed between. A part of the positive zone that extends from an edge of the adjustable impedance zone to an end point of the positive zone, and a part of the negative zone configured with a conductor are for high-frequency signal. A part that extends from the end point of the positive zone to an end point of the negative zone, and a part from the end point of the negative zone to where the conductor is configured on the negative zone are for low-frequency signal.

11 Claims, 17 Drawing Sheets

M: Forming adjustable impedance zone, and performing impedance matching according to frequency Enhancing signal gain

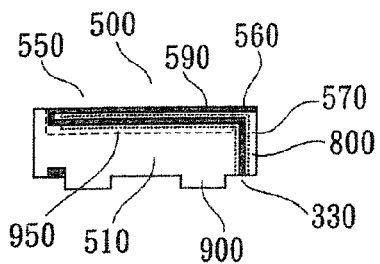
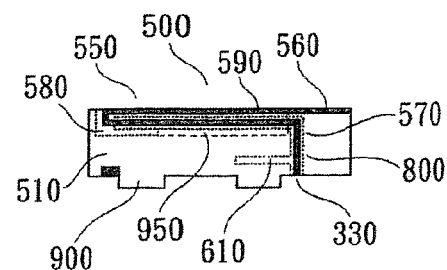
FIG. 42  FIG. 43
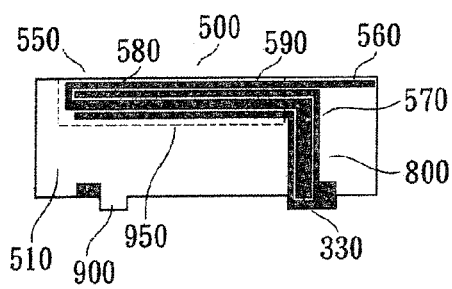
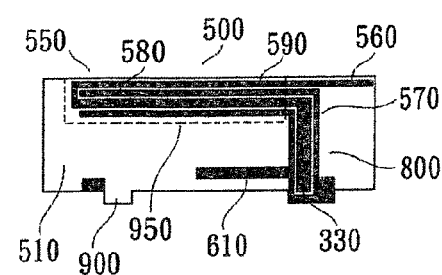
FIG. 44  FIG. 45
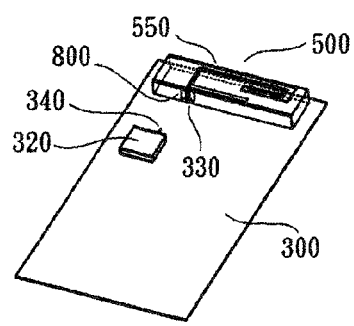
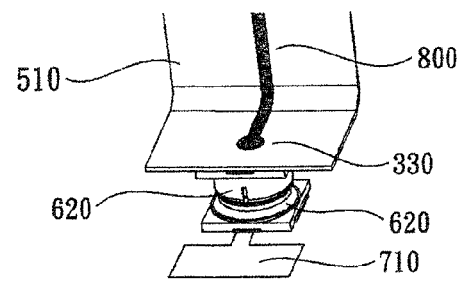
FIG. 46  FIG. 47

PIFA Antenna - Embedded PIFA Antenna

Transmission Line Load Antenna ( TLL Antenna)

US 9,160,573 B1

TRANSMISSION LINE LOAD ANTENNA MODULE

BACKGROUND OF THE INVENTION (a) Technical Field of the Invention

The present invention is generally related to antennas for wireless communication electronic devices, and more particular to a transmission line load antenna module.

(b) Description of the Prior Art

Wireless communication devices such as portable computers, handheld electronic appliances, etc. are widely popular. For these devices, communications are usually conducted using long-distance 850 MHz, 900 MHz, 1800 MHz, or 1900 MHz cellular band, or using 2100 MHz or LTE band. They can also use short-distance 2.4 GHz and 5 GHz WiFi band or 2.4 GHz Bluetooth band.

Since there is limited space in these wireless communication devices, impedance matching is required on their circuit boards so as to enhance their antenna bandwidth or radiation power. Additionally, to fulfill the need of various applications, multi-band and wide-band antennas are widely demanded. An improved antenna is therefore desired.

SUMMARY OF THE INVENTION

Therefore, the present invention provides a transmission line load antenna module for installing inside a casing of an electronic device (e.g., a desktop computer, a portable computer, a handheld electronic device, a TV, or a wireless access point), that obviates the prior art's shortcomings such as limited bandwidth and the required impedance matching on the device's circuit board so as to achieve broader bandwidth or radiation power as shown in FIG. 1. The antenna module provided by the present invention contains a transmission line, a resonant radiation area, and an antenna base. The antenna base can be a dielectric component as a part of the casing (such as a rib or a hook extended from inside of the casing) or it can be an independent and separate dielectric element.

The transmission line can be a coaxial transmission line or a microstrip transmission line. An end of the transmission line is installed in the resonant radiation area on the antenna base. The resonant radiation area contains a positive zone and a negative zone. The positive zone is extended from the negative zone, and a section of the positive zone and a section of the negative zone are arranged in parallel where an adjustable impedance zone as shown in FIG. 2 is formed between, and contains a capacitive structure and an inductive structure. A part of the positive zone that extends from an edge of the adjustable impedance zone to an end point of the positive zone, and a part of the negative zone configured with a conductor are for high-frequency signal. A part that extends from the end point of the positive zone to an end point of the negative zone, and a part from the end point of the negative zone to where the conductor is configured on the negative zone are for low-frequency signal.

The antenna module can be optimized by adjustment to have a desired ohm value and to cover multiple bands. The resonant radiation area can be arranged into a single-pole, dipole, multi-pole, or slot configuration. The transmission line load antenna therefore has multi-band and wide-bandwidth characteristics, which are the objectives of the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become apparent to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 3-1 shows the structure of a coaxial transmission line commonly applied to various kinds of electronic appliances.

FIGS. 3-2, 3-2, 3-3, 3-4, and 3-5 show a number of commonly applied microstrip transmission lines.

FIG. 4 shows a transmission line load antenna module using coaxial transmission line according to the present invention.

FIG. 5 shows two transmission line load antenna modules according to the present invention installed in an electronic device.

FIGS. 42 to 45 show embodiments with an extended contact of a transmission line load antenna module according to the present invention using microstrip transmission line.

FIGS. 46 to 50 show various connections to a printed circuit board by a transmission line load antenna module according to the present invention using microstrip transmission line.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
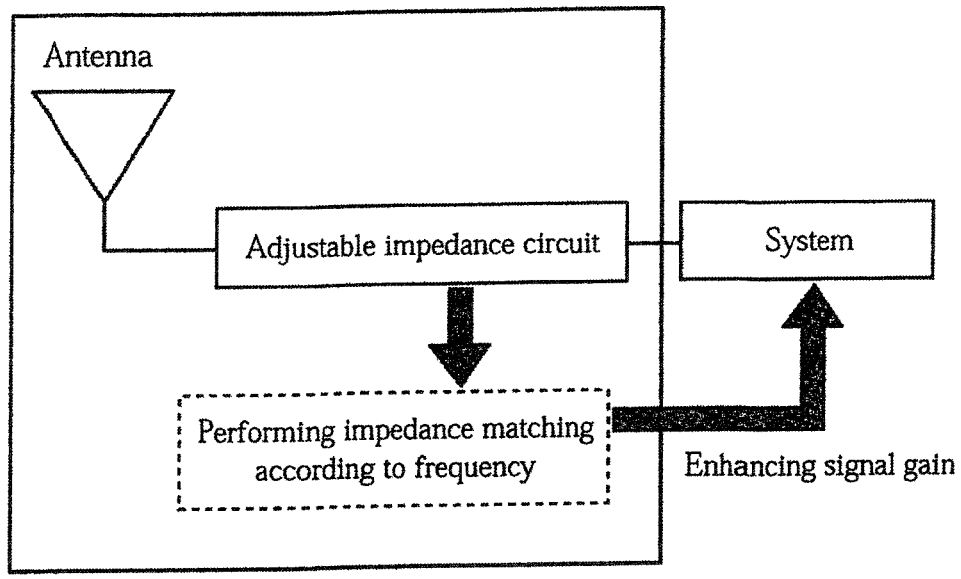
FIG. 1 shows the application environment of a conventional antenna module.
Figures 1, 3:
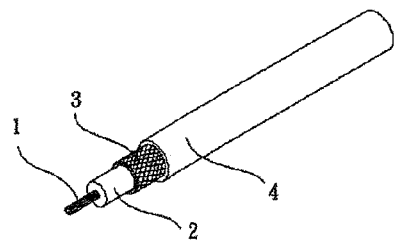
FIG. 3 shows a first piece and a second piece of the wire stripping device of FIG. 1 being locked together in their close positions.
Figures 2, 3:
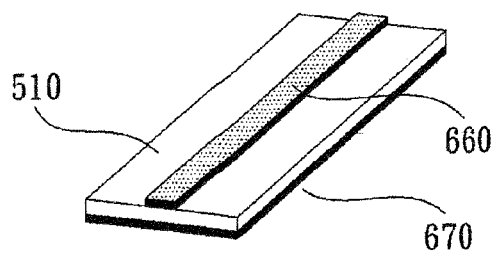
Figure 3:
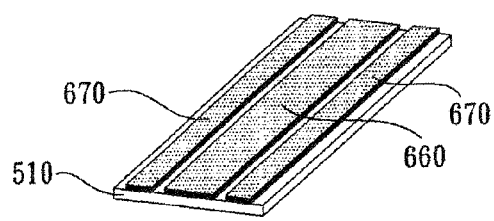
Figures 3, 4:
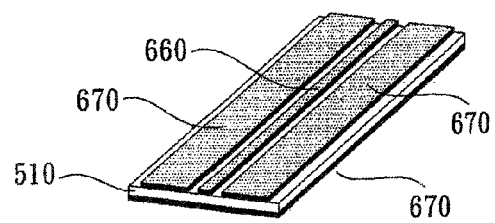
Figures 3, 4, 5:
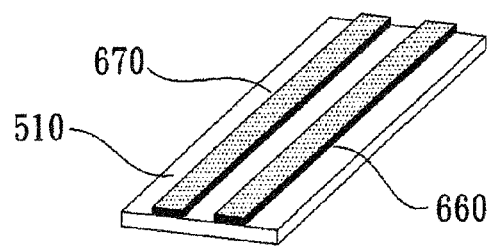
Figure 4:
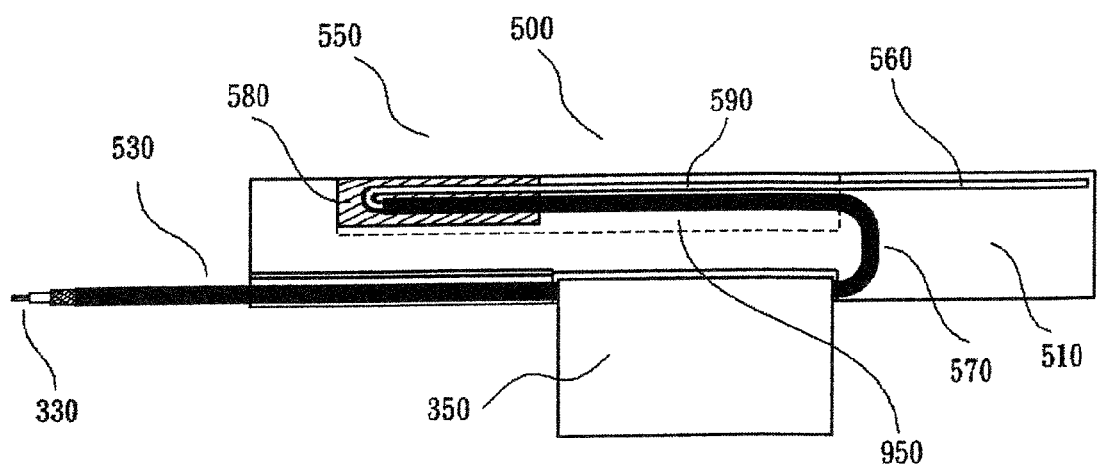
Figure 5:
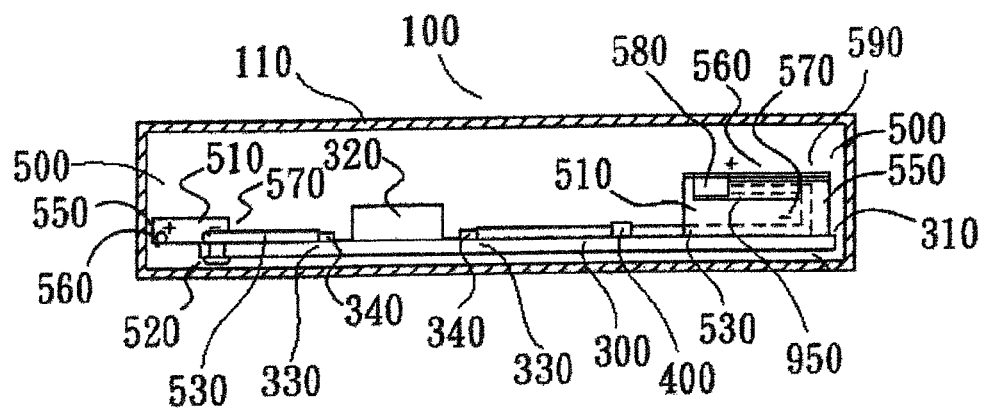
Figure 22:
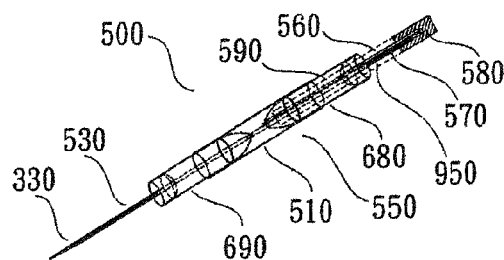
FIGS. 22 to 24 show additional embodiments of a transmission line load antenna module according to the present invention using coaxial transmission line.
Figure 23:
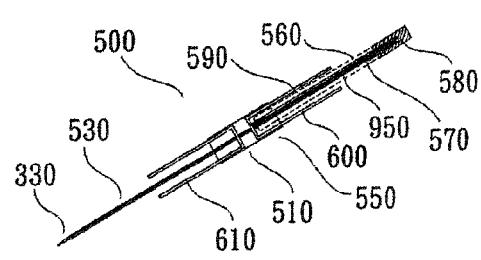

As shown in FIGS. 4 and 5, an antenna module 500 according to an embodiment of the present invention is installed inside a casing 110 of an electronic device 100 (there are two antenna modules 500 shown in FIG. 5). The antenna module 500 contains a coaxial transmission line 530, a resonant radiation area 550, and an antenna base 510. The antenna base 510 can be a dielectric component as a part of the casing 110 or, as shown in FIG. 5, it can be an independent and separate dielectric element. A section of the coaxial transmission line 530 at a first end forms the resonant radiation area 550 on the antenna base 510. The resonant radiation area 550 contains a positive zone 560 and a negative zone 570 in a single-pole, dipole, multi-pole, or slot antenna configuration. FIG. 3-1 shows the structure of a coaxial transmission line commonly applied to various kinds of electronic appliances. Subsequently, whenever the present specification mentions a coaxial transmission line, its structure can be referred to FIG. 3-1. As illustrated, the positive zone 560 is a section of the resonant radiation area 550 at the first end of the coaxial transmission line 530 having its outer jacket 4 and woven shield 3 removed and its insulator 2 (including the surrounded core 1) exposed. The negative zone 570 is the other section of the resonant radiation area 550 without having its outer jacket 4 and woven shield 3 removed. An adjustable impedance zone 950 is formed by arranging a section of the positive zone 560 and a section of the negative zone 570 in parallel, within which a capacitive structure 580 and an inductive structure 590 are achieved. Depending on the desired frequency and the installation environment, conductors are configured in the positive and negative zones 560 and 570. For the positive zone 560, the conductor is electrically connected to the core 1 of the coaxial transmission line 530 where the surrounding insulator 2 can be optionally removed. The conductor can be a metallic tube 680 as shown in FIG. 22, or a conductive support arm 600 as shown in FIG. 23. For the negative zone 570, the conductor can be a conductive element 310 as shown in FIG. 5, a conductive flat piece 350 as shown in FIG. 4, a metallic tube 690 as shown in FIG. 22, or a conductive support arm 610 as shown in FIG. 23. A part of the positive zone 560 that extends from an edge of the adjustable impedance zone 950 to an end point of the positive zone 560, and a part of the negative zone 570 configured with the conductor are for high-frequency signal. A part that extends from the end point of the positive zone 560 to an end point of the negative zone 570, and from the end point of the negative zone 570 to where the conductor is configured on the negative zone 570 are for low-frequency signal. These frequencies and their bandwidths can be optimized by adjusting the antenna module 500 to have a desired ohm value. The negative zone 570 can keep the outer jacket 4 so that the woven shield 3 beneath is not exposed, and have the conductor directly joined to the outer jacket 4. Radiation waves are produced due the discontinuous electrical current. Alternatively, the outer jacket 4 can be removed and the woven shield 3 is joined to the conductor.

Figure 6:
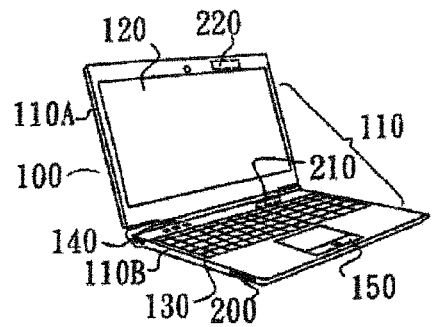
FIG. 6 shows a number of locations of an electronic device where a transmission line load antenna module according to the present invention can be installed.
Figure 7:
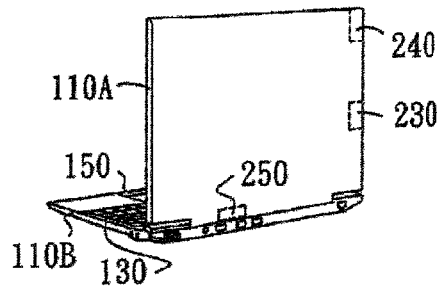
FIG. 7 shows the electronic device of FIG. 6 viewed from a different perspective.
Figure 8:
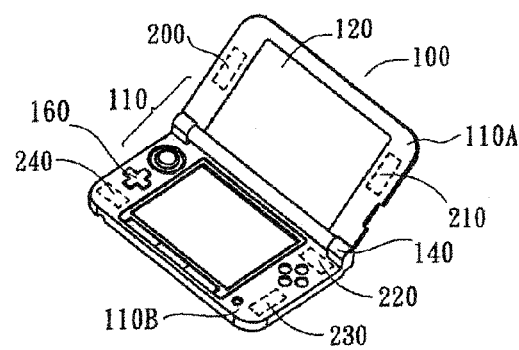
FIG. 8 shows a number of locations of another electronic device where a transmission line load antenna module according to the present invention can be installed.

The electronic device 100 (i.e., a smart phone, a tablet computer, a notebook computer, a portable apparatus, etc.) supports one or more radio transceiver circuits 320 (see FIG. 5) which require at least an antenna embedded in the casing 110 for signal transmission and reception. The casing 110 can be made of a plastic, wooden, glass, ceramic, metal, or other appropriate material, or a combination of the foregoing. A portion of the casing 110 can be made of a dielectric or other material of low conductivity. For example, in FIG. 6, the electronic device 100 is a notebook computer, and the module 500 can be installed in one or more of the areas 200, 210, and 220. The area 200 is located in a front left region of a lower casing 110B, the area 201 is located in a rear right region of the lower casing 110B, and the area 220 is located in a top front region of an upper casing 110A. Alternatively, in FIG. 7, the antenna module 500 can also be installed in one or more of the areas 230, 240, and 250, or other appropriate areas. FIG. 8 depicts another electronic device 100 where the antenna module 500 can be installed in areas 200, 210, 220, 230, or 240.

Figure 9:
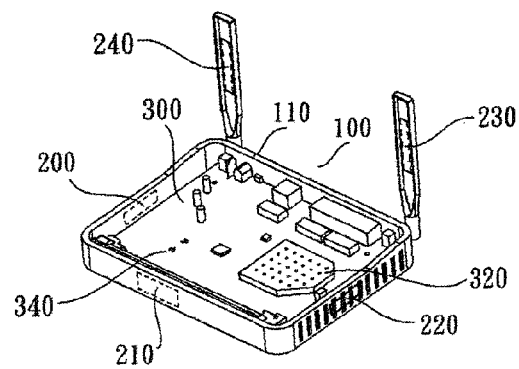
FIG. 9 shows a number of locations of yet another electronic device where a transmission line load antenna module according to the present invention can be installed.

As shown in FIG. 9, the electronic device 100 (i.e., a router, a set-top box, etc.) can have a casing assembly 110, and the antenna module 500 can be installed in any appropriate area such as the area 200, 210, 220 230, or 240.

Figure 10:
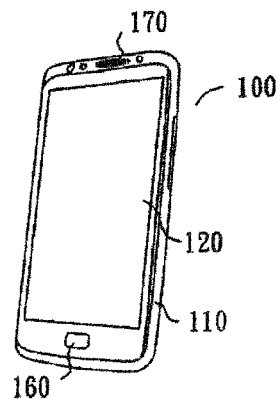
FIG. 10 shows a number of locations of still another electronic device where a transmission line load antenna module according to the present invention can be installed.
Figure 11:
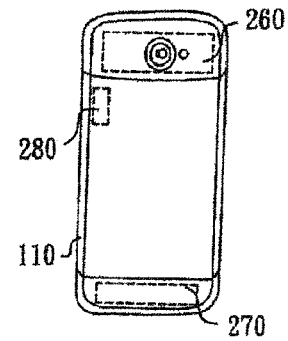
FIG. 11 shows the electronic device of FIG. 10 viewed from a different perspective.
Figure 12:
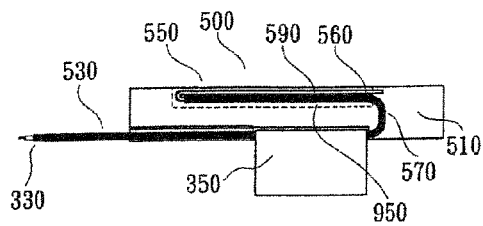
FIGS. 12 to 19 show the various embodiments of a transmission line load antenna module according to the present invention using coaxial transmission line.
Figure 13:
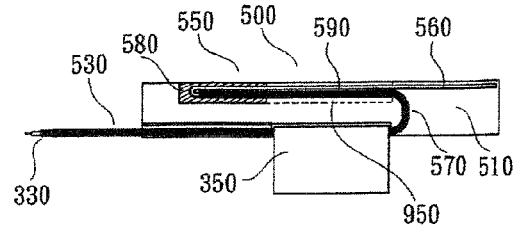
Figure 14:
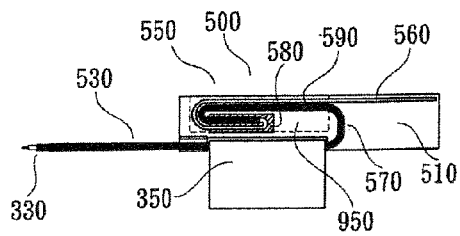
Figure 15:
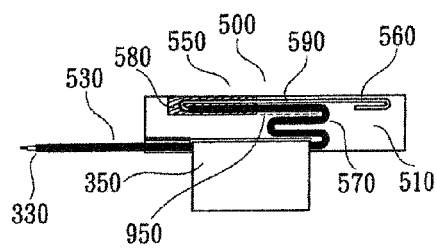
Figure 16:
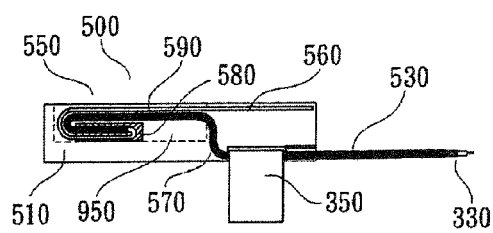
Figure 17:
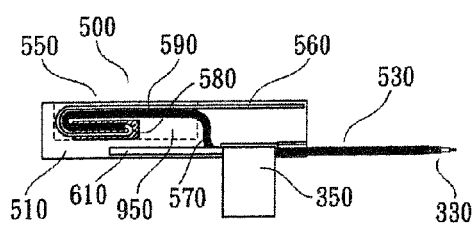
Figure 18:
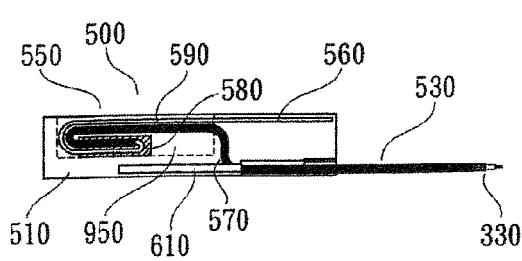
Figure 19:
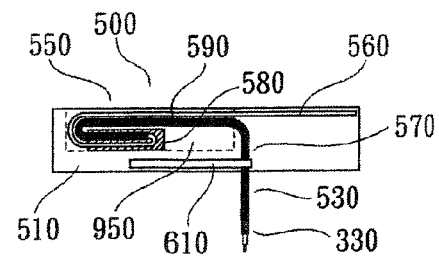

As shown in FIGS. 10 and 11, the electronic device 100 can be a handheld appliance (i.e., a smart phone capable of mobile communications, data transmission, location positioning, etc.) usually configured with a display 120 (can be a touch-sensitive one), a speaker port 170, and other buttons 160. As shown in FIG. 11, the antenna module 500 can be installed in areas 260, 270, and 280 inside the casing 100, or other appropriate places.

The antenna module 500 can be configured to cover a single-band or multi-band signal, and the radio transceiver circuit 320 connecting the antenna module 500, as shown in FIG. 5, can be installed on a printed circuit board 300 (the printed circuit board 300 can function as the conductive element 310), or other appropriate structure. As shown in FIG. 4, a radio input terminal 330 of the antenna module 500 is connected to the radio transceiver circuit 320 for signal transmission and reception.

FIGS. 12 to 19 provide various structures of the antenna module 500 where the coaxial transmission line 530 is arranged to form the resonant radiation area 550 which includes the positive zone 560, the negative zone 570, and the adjustable impedance zone 950, as described in the paragraph. The radio input terminal 330 can have its positive conductor and negative conductor connected to the radio transceiver circuit 320 by soldering, pressing, or clamping.

Figure 20:
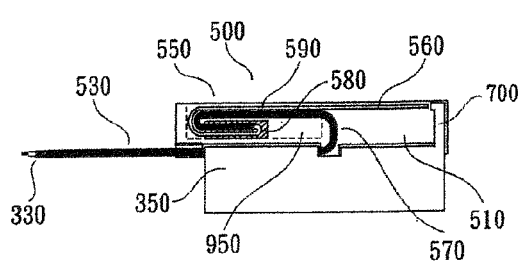
FIGS. 20 and 21 show two embodiments of a transmission line load antenna module according to the present invention using coaxial transmission line for enhanced immunity against other antenna modules.
Figure 21:
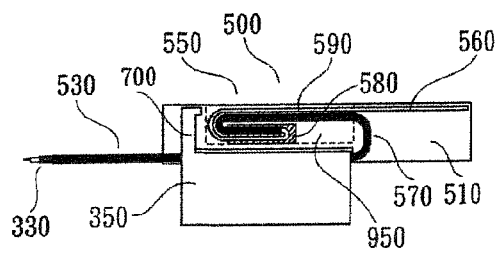

As shown in FIGS. 20 and 21, when multiple antenna modules 500 are installed and to avoid their interference, a conductive strip 700 of an appropriate dimension can be installed to a side of the resonant radiation area 550 and joined to the conductive flat piece 350 or, alternatively, the conductive strip 700 and the conductive flat piece 350 are integrally formed, so as to alter the distribution of electrical current and to enhance the immunity of the antenna modules 500 against each other.

Figure 24:
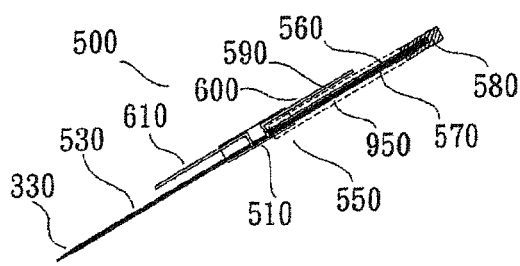

As shown in FIGS. 22 to 24, the resonant radiation area 550, and the positive zone 560 are structured the same way described in the paragraph. The coaxial transmission line 530 of the positive zone 560 has its core 1 stripped of the insulator 2 at the tip and then the stripped core 1 is electrically connected to the conductor in the form of a conductive support arm 600 or a metallic tube 680. The negative zone 570 can keep the outer jacket 4 so that the woven shield 3 beneath is not exposed, and the outer jacket 4 is joined to the conductive support arm 610 or metallic tube 690. Alternatively, the outer jacket 4 is partially stripped so that the revealed woven shield 3 is used to connect the conductive support arm 610 or the metallic tube 690.

Figure 25:
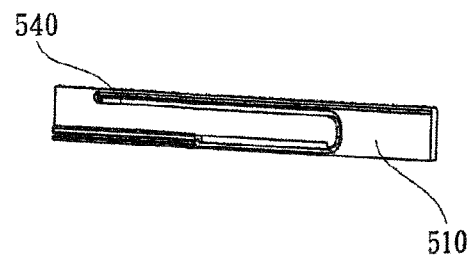
FIG. 25 shows an antenna base of a transmission line load antenna module according to the present invention.
Figure 26:
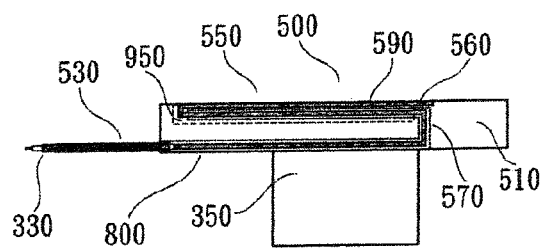
FIGS. 26 to 33 show the various embodiments of a transmission line load antenna module according to the present invention using microstrip transmission line.

As shown in FIG. 25, along with FIGS. 4 and 5, the antenna base 510 can be an independent element made of a dielectric material, or can be a part of the casing 110 directly extended from the inside of the casing 110. The antenna base 510 has a duct 540 inside or on the surface of the antenna base 510 for positioning the resonant radiation area 550 and for adjusting antenna characteristics. The entire duct 540 or a part of it can have its cross section adjusted to fit the diameter of the resonant radiation area 550. The placement of the antenna base 510 is dependent on the space of the casing 110, the grounding, and the quality of signal reception. Therefore, the antenna base 510 can be placed flatly (e.g., the antenna base 510 to the left of FIG. 5) or raised upright (e.g., the antenna base 510 to the right of FIG. 5).

Figure 2:
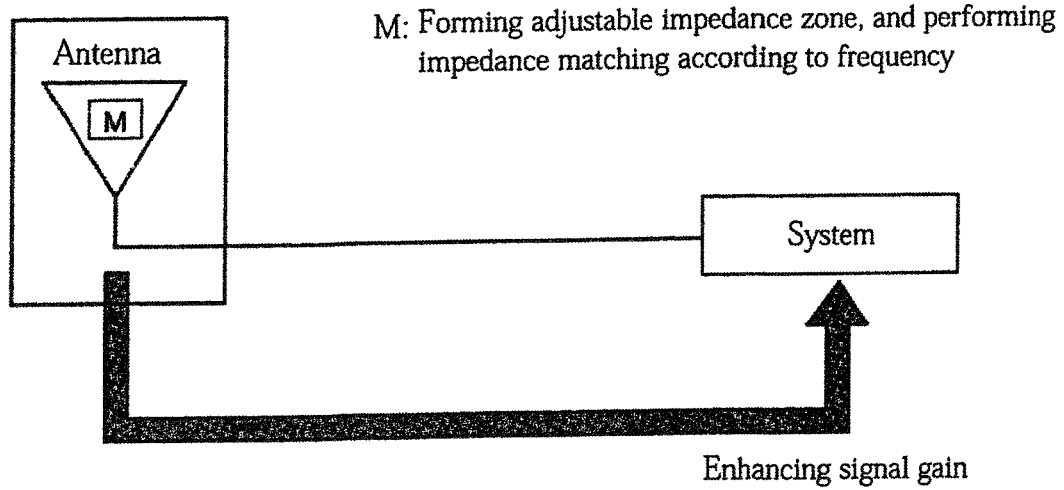
FIG. 2 shows the application environment of a transmission line load antenna module according to the present invention.
Figure 27:
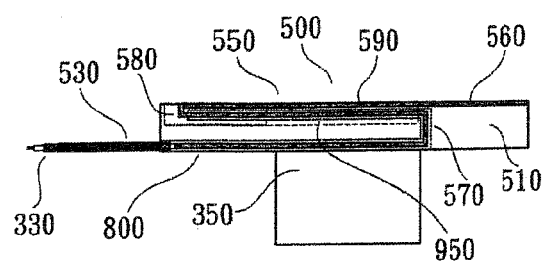
Figure 28:
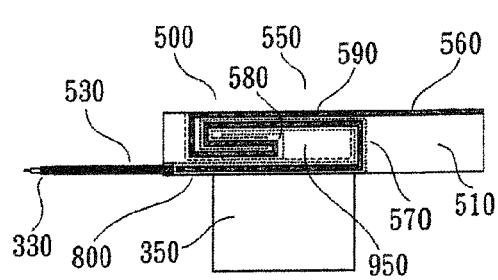
Figure 29:
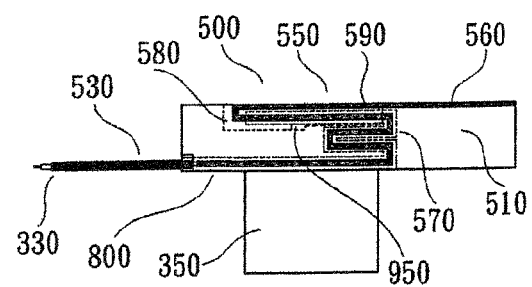
Figure 30:
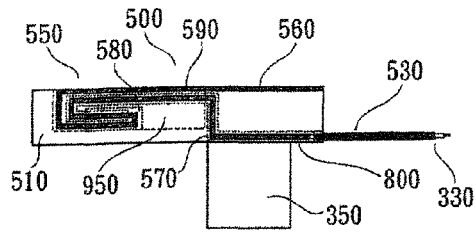
Figure 31:
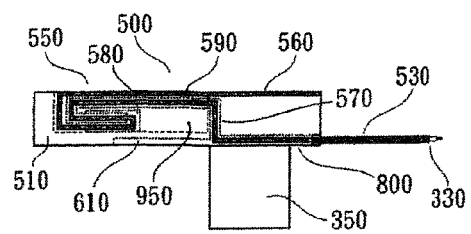
Figure 32:
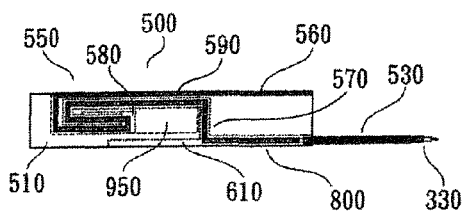
Figure 33:
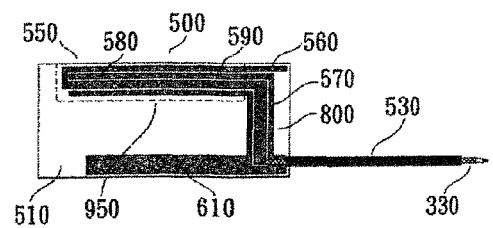
Figure 34:
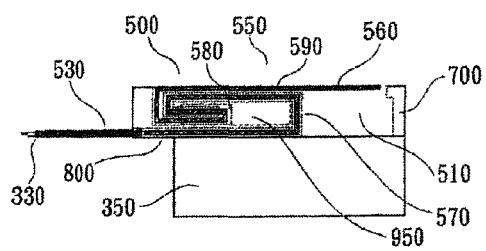
FIGS. 34 and 35 show two embodiments of a transmission line load antenna module according to the present invention using microstrip transmission line for enhanced immunity against other antenna modules.
Figure 35:
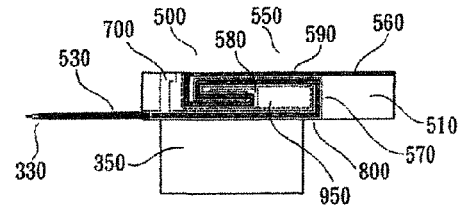
Figure 36:
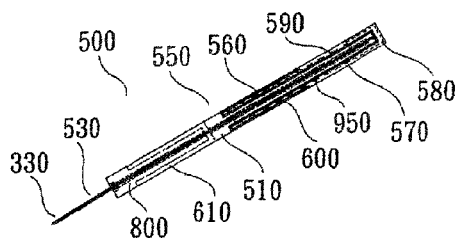
FIGS. 36 and 37 show additional embodiments of a transmission line load antenna module according to the present invention using microstrip transmission line.
Figure 37:
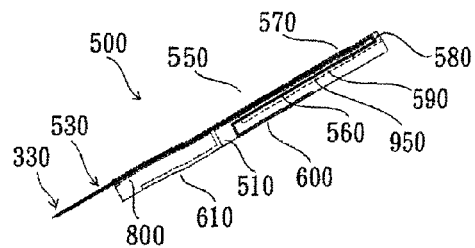
Figure 38:
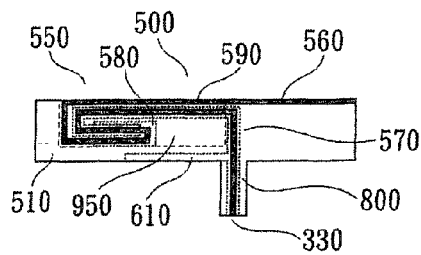
FIGS. 38 and 39 show capacitive structures formed in embodiments of a transmission line load antenna module according to the present invention using microstrip transmission line.
Figure 39:
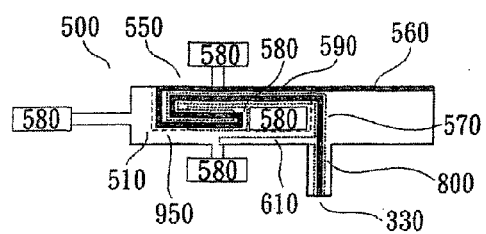
Figure 40:
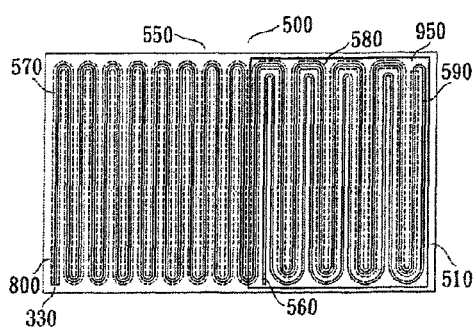
FIGS. 40 and 41 show additional embodiments of a transmission line load antenna module according to the present invention using microstrip transmission line.
Figure 41:
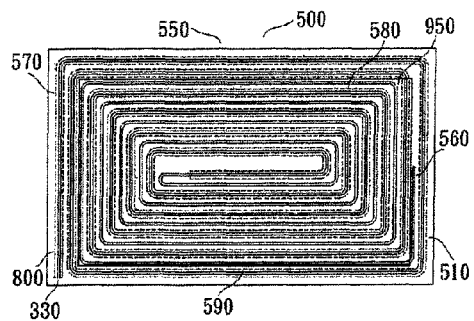
Figure 48:
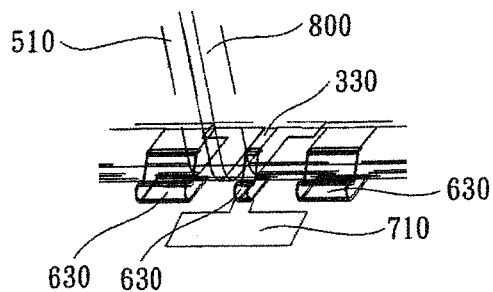
Figure 49:
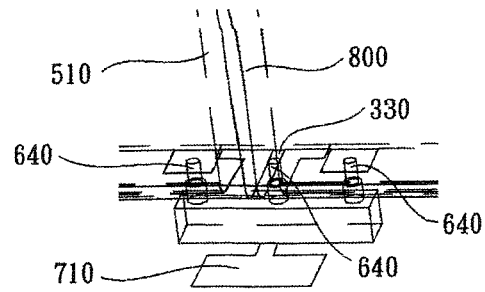
Figure 50:
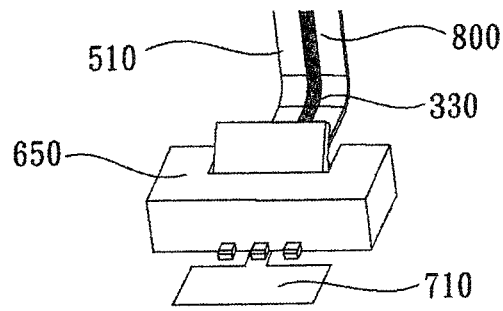
Figure 51:
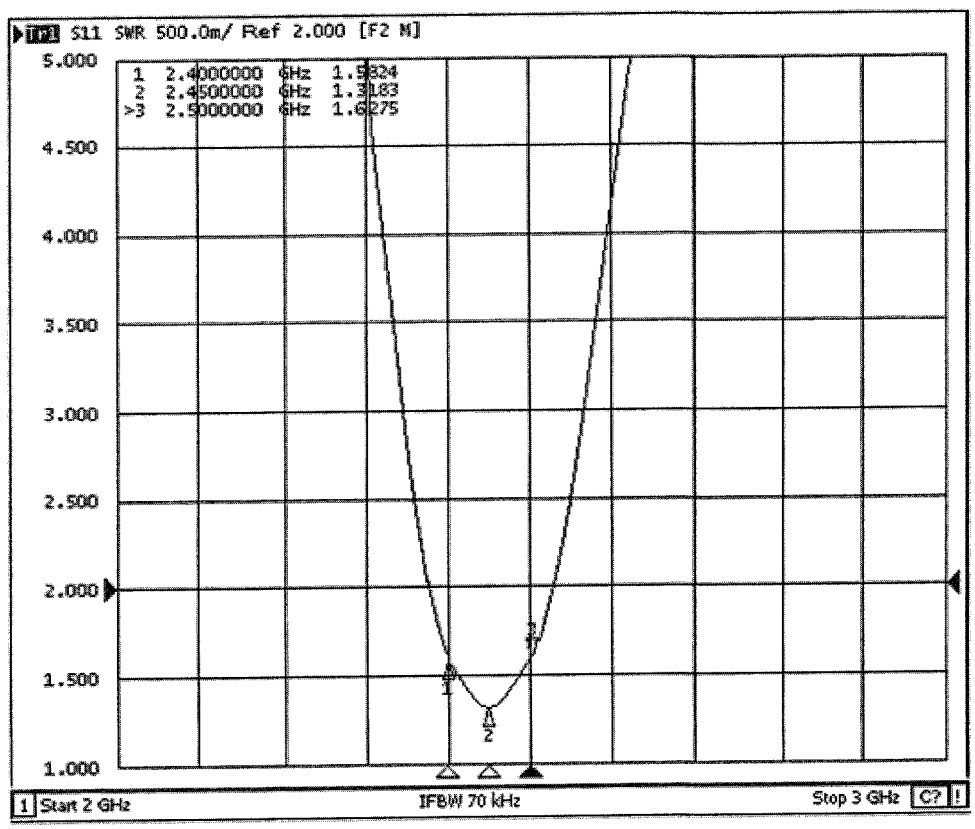
FIG. 51 shows the efficiency and voltage standing wave ratio (VSWR) measured from an ordinary single-frequency planar inverted-F antenna (PIFA)
Figure 52:
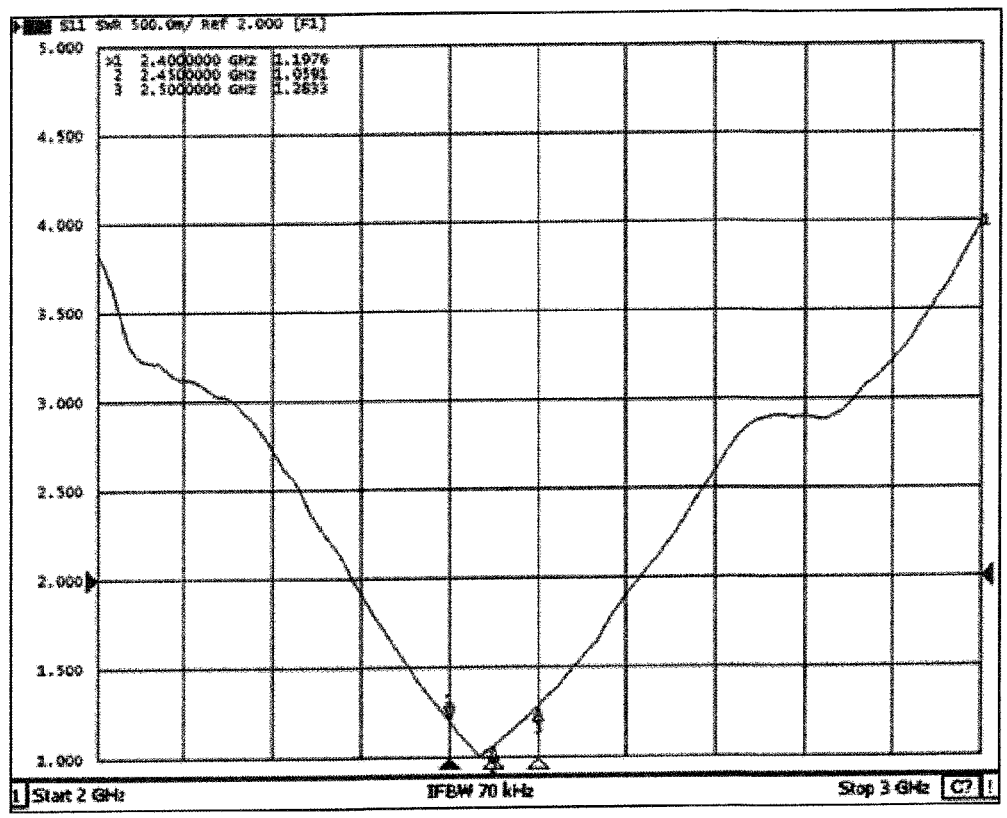
FIG. 52 shows the efficiency and voltage standing wave ratio (VSWR) measured from a single-frequency transmission line load antenna according to the present invention.
Figure 53:
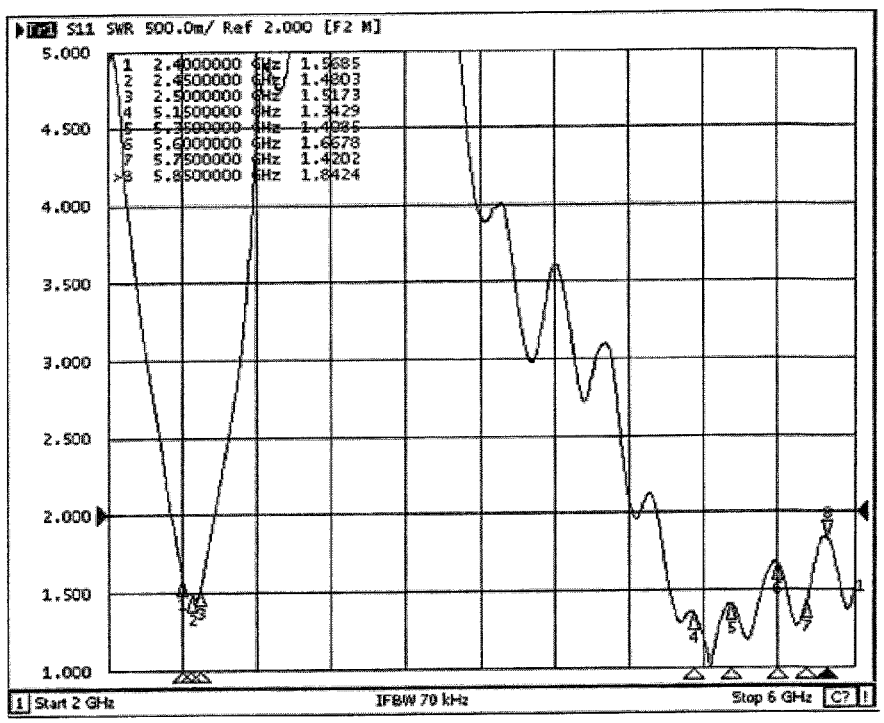
FIG. 53 shows the efficiency and voltage standing wave ratio (VSWR) measured from an ordinary dual-frequency planar inverted-F antenna (PIFA)
Figure 54:
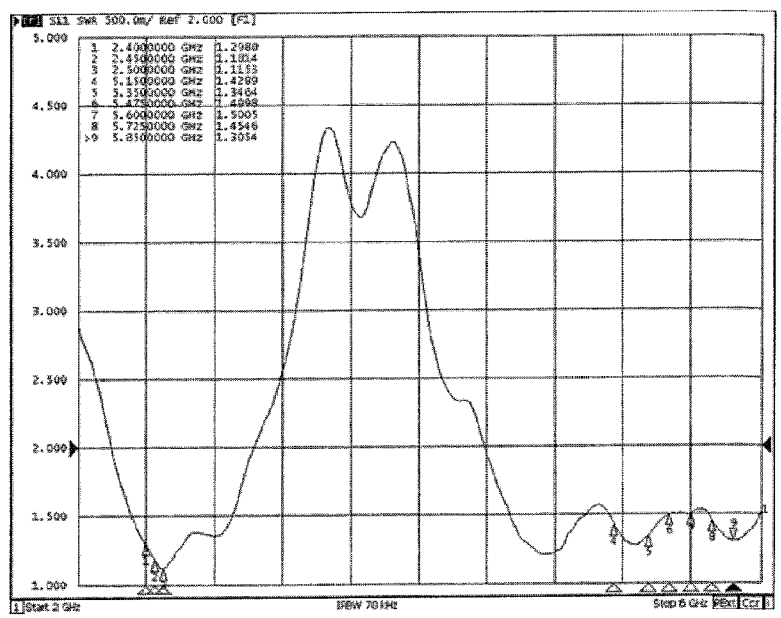
FIG. 54 shows the efficiency and voltage standing wave ratio (VSWR) measured from a dual-frequency transmission line load antenna according to the present invention.
Figure 55:
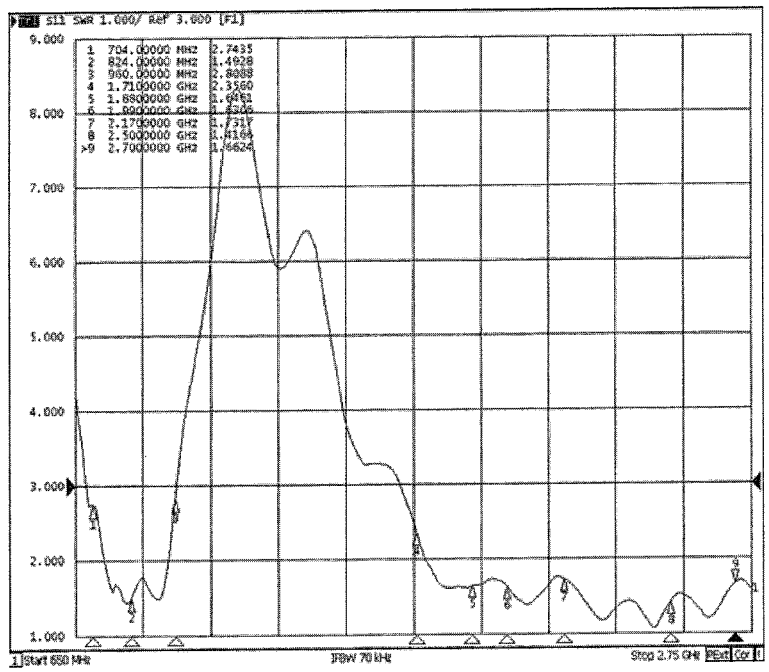
FIG. 55 shows the efficiency and voltage standing wave ratio (VSWR) measured from another dual-frequency transmission line load antenna according to the present invention.
Figure 56:
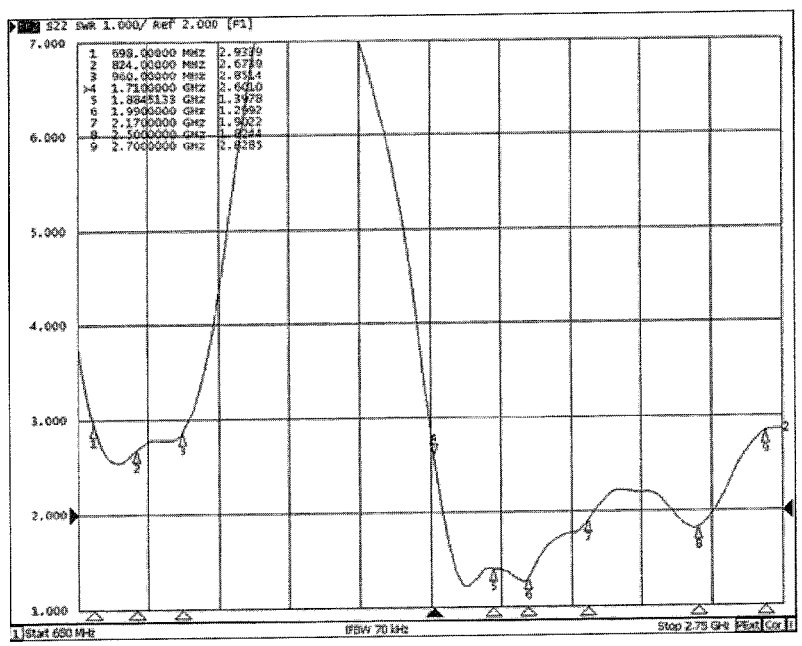
FIG. 56 shows the efficiency and voltage standing wave ratio (VSWR) measured from yet another dual-frequency transmission line load antenna according to the present invention.

As shown in FIGS. 26 to 45, the antenna base 510 can be an independent element made of a dielectric material, such as a hard printed circuit board (PCB) or a flexible printed circuit board (FPCB), or an element made of ceramics or plastics. A microstrip transmission line 800 has one end installed in the resonant radiation area 550 of the antenna base 510 where the positive zone 560 and the negative zone 570 can be arranged in a single-pole, dipole, multi-pole, or slot antenna configuration. FIGS. 3-2, 3-2, 3-3, 3-4, and 3-5 show a number of commonly applied microstrip transmission lines. For the embodiments shown in FIGS. 26 to 33, the microstrip transmission line 800 is arranged in a configuration shown in FIG. 3-2. As illustrated in FIG. 3-2, a positive metallic layer 660 (i.e., the positive zone 560) is parallel with a negative metallic layer 670 (i.e., the negative zone 570) and the adjustable impedance zone 950 having the capacitive structure 580 and the inductive structure 590 are formed between. Depending on the desired frequency and installation environment, conductors are arranged along with the positive and negative metallic layers 660 and 670. For the positive metallic layer 660, it is connected with a conductor such as the conductive support arm 600 shown in FIGS. 36 and 37. For the negative metallic layer 670, it is connected with a conductor such as the conductive element 310 shown in FIG. 5, the conductive flat piece 350 shown in FIG. 27, the conductive support arm 610 of FIG. 32, or the conductive support arm 610 shown in FIGS. 36 and 37. A part of the positive metallic layer 660 that extends from an edge of the adjustable impedance zone 950 to an end of the positive metallic layer 660, and the part of the negative metallic layer 670 configured with the conductor are for high-frequency signal. A part that extends from the end of the positive metallic layer 660 to an end of the negative metallic layer 670, and from the end of the negative metallic layer 670 to where the conductor is configured on the negative metallic layer 670 are for low-frequency signal. These frequencies and their bandwidths can be optimized by adjusting the antenna module 500 to have a desired ohm value. As shown in FIGS. 34 and 35, to prevent multiple antenna modules 500 from interfering each other, a conductive strip 700 of an appropriate dimension can be installed to a side of the resonant radiation area 550 and joined to the conductive flat piece 350 or, alternatively, the conductive strip 700 and the conductive flat piece 350 are integrally formed on the antenna base 510, so as to alter the distribution of electrical current and to enhance the immunity of the antenna modules 500 against each other. As shown in FIG. 39, the antenna base 510 is an independent dielectric element such as FPCB, and the capacitive structure 580 can be configured to a side of the antenna base 510 and then bended into the adjustable impedance zone 950. The connection of the antenna module 500 to the printed circuit board 300 can be achieved using a radio-frequency (RF) connector 620 shown in FIG. 47, flexible metallic pieces 630 shown in FIG. 48, elastic probes 640 shown in FIG. 49, a flat-cable connector 650 shown in FIG. 50, or soldering. An impedance matching zone 710 can be configured on the printed circuit board 300 shown in FIG. 46. As shown in FIGS. 42 to 45, the antenna base 510 is an independent dielectric element such as a hard PCB. Along a side of the antenna base 510 where the radio input terminal 330 is configured, a contact 900 is extended from a side for electrically connecting with the PCB 300 as shown in FIG. 5.

The performance data of the transmission line load antenna module of the present invention is provided in FIGS. 51 to 56. It can be seen that the antenna module 500 has superior performance, in addition to its flexibility in the material used, simplicity in terms of design, and convenience in installation.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A transmission line load antenna module for installing inside a casing of an electronic device, comprising:
   a transmission line;

an antenna base made of a dielectric material; and a resonant radiation area on the antenna base formed by a second of the transmission line at an end of the transmission line;

wherein the resonant radiation area comprises a positive zone, a negative zone, and an adjustable impedance zone;

the positive zone is extended from the negative zone;

a section of the positive zone and a section of the negative zone are arranged in parallel where the adjustable impedance zone is formed between, and comprises a capacitive structure and an inductive structure;

a part of the positive zone that extends from an edge of the adjustable impedance zone to an end point of the positive zone, and a part of the negative zone configured with a conductor are for high-frequency signal; and a part that extends from the end point of the positive zone to an end point of the negative zone, and a part from the end point of the negative zone to where the conductor is configured on the negative zone are for low-frequency signal.

2. The transmission line load antenna module according to claim 1, wherein the transmission line is a coaxial transmission line.

3. The transmission line load antenna module according to claim 1, wherein the transmission line is a microstrip transmission line.

4. The transmission line load antenna module according to claim 1, wherein the antenna base is an independent plastic element having a duct inside or on a surface of the antenna base for positioning the resonant radiation area and for adjusting antenna characteristics.

5. The transmission line load antenna module according to claim 1, wherein the antenna base is an independent printed circuit board whose surface is configured with a positive metallic layer and a negative metallic layer for positioning the resonant radiation area and for adjusting antenna characteristics.

6. The transmission line load antenna module according to claim 1, wherein the antenna base is an independent ceramic element whose surface is configured with a positive metallic layer and a negative metallic layer for positioning the resonant radiation area and for adjusting antenna characteristics.

7. The transmission line load antenna module according to claim 1, wherein antenna base is a dielectric component of the casing inside the casing.

8. The transmission line load antenna module according to claim 1, wherein the positive zone is connected to a conductor that is a conductive support arm; and the negative zone is connected to a conductor that is a conductive support arm.

9. The transmission line load antenna module according to claim 1, wherein the positive zone is connected to a conductor that is a metallic tube; and the negative zone is connected to a conductor that is a metallic tube.

10. The transmission line load antenna module according to claim 1, wherein a conductive strip is installed to a side of the resonant radiation area so as to alter the distribution of electrical current and to enhance the immunity of the transmission line load antenna module against other antenna modules.

11. The transmission line load antenna module according to claim 1, wherein the transmission line load antenna module is connected to a printed circuit board using one of soldering, a radio-frequency (RF) connector, a flexible metallic pieces, an elastic probes, and a flat-cable connector.

* * * * *